(12) United States Patent
Rodrigues et al.

(10) Patent No.: US 11,947,861 B1
(45) Date of Patent: *Apr. 2, 2024

(54) CONNECTING TO REMOTE ACCESS SESSION BASED ON PROXIMITY OF MOBILE DEVICE

(71) Applicant: PARALLELS INTERNATIONAL GmbH, Schaffhausen (CH)

(72) Inventors: Claudio Rodrigues, Ottawa (CA); Nikolay Dobrovolskiy, Moscow (RU); Serguei M. Beloussov, Singapore (SG); Liubov Kulakova, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,741

(22) Filed: Dec. 12, 2022

Related U.S. Application Data

(63) Continuation of application No. 17/566,237, filed on Dec. 30, 2021, now Pat. No. 11,537,355, which is a continuation of application No. 17/130,633, filed on Dec. 22, 2020, now Pat. No. 11,221,818, which is a continuation of application No. 16/776,252, filed on (Continued)

(51) Int. Cl.
| | |
|---|---|
| *H04L 9/40* | (2022.01) |
| *G06F 3/14* | (2006.01) |
| *G06F 21/31* | (2013.01) |
| *G09G 5/00* | (2006.01) |
| *H04L 67/14* | (2022.01) |
| *H04L 67/52* | (2022.01) |

(Continued)

(52) U.S. Cl.
CPC ............ *G06F 3/1454* (2013.01); *G06F 21/31* (2013.01); *G09G 5/006* (2013.01); *H04L 63/10* (2013.01); *H04L 63/102* (2013.01); *H04L 63/107* (2013.01); *H04L 67/14* (2013.01); *H04L 67/52* (2022.05); *H04W 88/04* (2013.01); *H04W 88/06* (2013.01)

(58) Field of Classification Search
CPC ......... H04L 67/52; H04L 67/14; H04L 63/10; H04L 63/102; H04L 63/107
See application file for complete search history.

(56) References Cited

U.S. PATENT DOCUMENTS

| | | |
|---|---|---|
| 5,298,695 A | 3/1994 | Bahjat et al. |
| 8,532,652 B1 | 9/2013 | Edara |

(Continued)

*Primary Examiner* — Viet D Vu
(74) *Attorney, Agent, or Firm* — Rosenberg, Klein & Lee

(57) ABSTRACT

The subject matter of this specification can be implemented in, among other things, a method that includes storing first client information identifying a first client device, identifying a location of the first client device, and identifying a first remote access session that provides the first client device access to resources of the remote access system. The method further includes receiving access information identifying an access device and a user account associated with the first client information. The access information indicates that the user account has been successfully authenticated by the access device. The method further includes, in response to the receipt of the access information, causing the first client device to connect to the first remote access session with the remote access system as a background process of the client device while a user interface of the client device remains locked.

5 Claims, 4 Drawing Sheets

Related U.S. Application Data

Jan. 29, 2020, now Pat. No. 10,952,067, which is a continuation of application No. 15/601,908, filed on May 22, 2017, now Pat. No. 10,579,322.

(51) Int. Cl.
*H04W 88/04* (2009.01)
*H04W 88/06* (2009.01)

(56) References Cited

U.S. PATENT DOCUMENTS

| | | |
|---|---|---|
| 8,661,144 B2 | 2/2014 | Schultz et al. |
| 8,667,153 B2 | 3/2014 | Kamay et al. |
| 9,355,231 B2 | 5/2016 | Disraeli |
| 9,367,676 B2 | 6/2016 | Wilson |
| 9,477,825 B1 | 10/2016 | Sinchak et al. |
| 10,306,468 B2 | 5/2019 | Williams et al. |
| 10,554,645 B2 | 2/2020 | Hefetz |
| 11,120,110 B2 | 9/2021 | Gren |
| 2014/0047510 A1 | 2/2014 | Belton et al. |
| 2014/0274035 A1 | 9/2014 | Unger et al. |
| 2014/0359735 A1 | 12/2014 | Lehmann et al. |
| 2015/0038162 A1* | 2/2015 | Duleba ................ H04W 4/029 455/456.1 |
| 2015/0242605 A1 | 8/2015 | Du et al. |
| 2016/0098303 A1* | 4/2016 | Balakrishnan ............ G06F 9/52 718/102 |
| 2016/0342784 A1 | 11/2016 | Beveridge et al. |
| 2017/0289168 A1 | 10/2017 | Bar et al. |
| 2017/0302659 A1 | 10/2017 | Shteingart et al. |
| 2018/0048630 A1 | 2/2018 | Griffin |

* cited by examiner

CONNECTING TO REMOTE ACCESS SESSION BASED ON PROXIMITY OF MOBILE DEVICE

RELATED APPLICATIONS

This application is a continuation of U.S. patent application Ser. No. 17/566,237 filed Dec. 30, 2021; which itself claims the benefit of priority from U.S. patent application Ser. No. 17/130,633 filed Dec. 22, 2020 which has issued as U.S. Pat. No. 11,221,818; which itself claims the benefit of priority from U.S. patent application Ser. No. 16/776,262 filed Jan. 29, 2020, issued as U.S. Pat. No. 11,175,878; which itself claims the benefit of priority from U.S. patent application Ser. No. 15/601,908 filed on May 22, 2017, issued as U.S. Pat. No. 10,579,322; the entire contents of each being incorporated by reference herein.

TECHNICAL FIELD

This instant specification relates to initiating a remote access session based on a history of connections to the remote access session and to connecting to the remote access session based on proximity of a mobile device.

BACKGROUND

Remote access from one computing device to another may be provided, for example, by a terminal server or remote desktop virtualization. A terminal server allows a client computing device to connect to a server computing device over a network, such as a local area network (LAN) or the Internet. Often times, a terminal server allows the client computing device to access network server applications on the server computing device. The terminal server may allow the server computing device to be remotely controlled, monitored, or diagnosed by the client computing device over a telecommunications network.

Remote desktop virtualization also operates in a client/server computing environment. Application execution takes place on a remote operating system which communicates with the local client device over a network using a remote display protocol through which the user interacts with applications. Generally, the applications and the data that are used remain on the remote system with only display, keyboard, and mouse information communicated with the local client device. In some cases, multiple desktop operating system instances are hosted on a server hardware platform running a hypervisor, where the desktop operating system instances being hosted may be instances of the same operating system as the remote operating system or instances of other operating systems.

DETAILED DESCRIPTION

Figure 1:
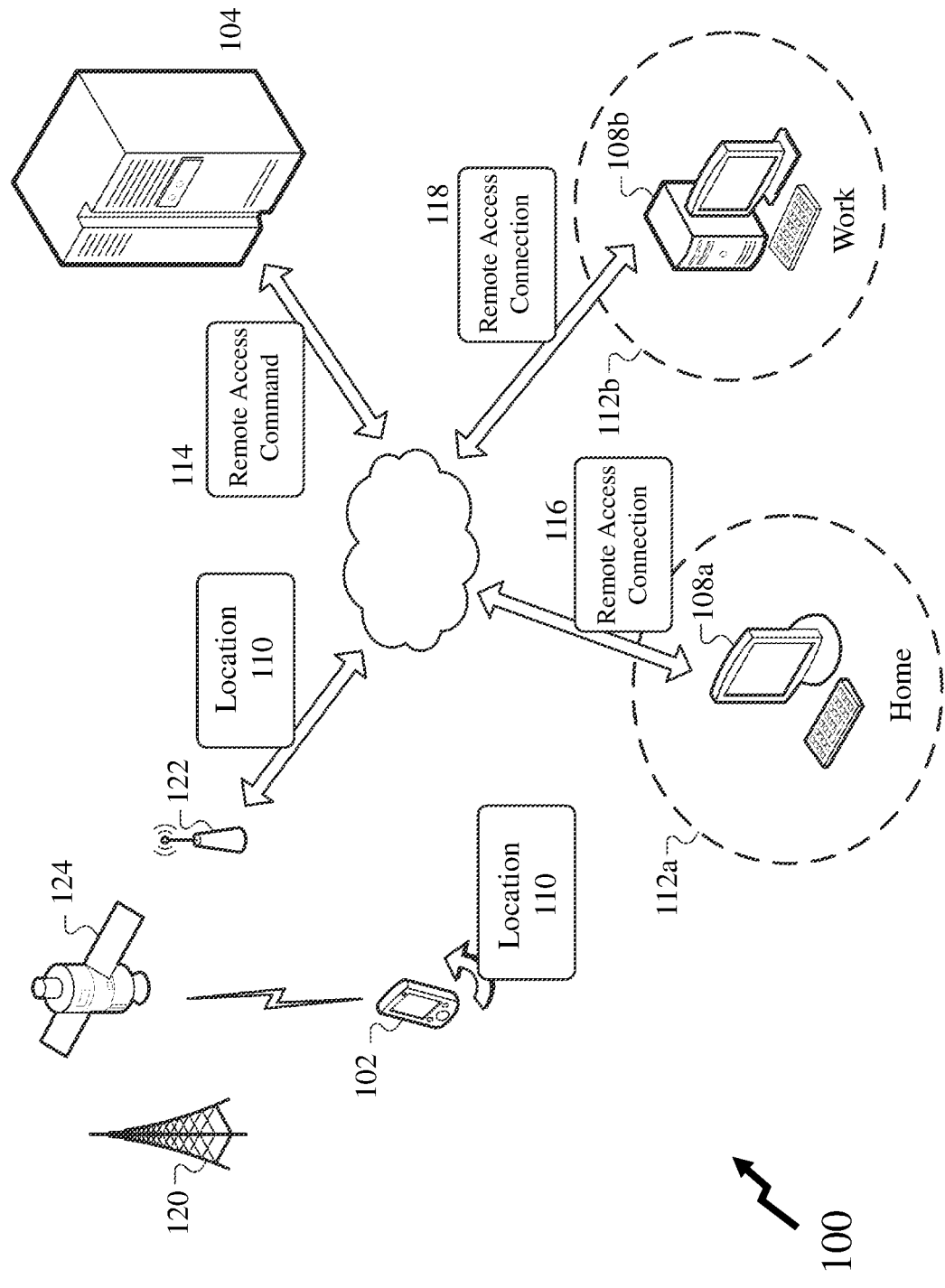
FIG. 1 is a schematic diagram that shows an example of a system for initiating a remote access session based on a history of connections to the remote access session and/or for connecting to the remote access session based on proximity of a mobile device.

When a conventional client device is used to connect to a remote access session at a server device, a user must often wait after logging in to the client device to initiate and/or connect to the remote access session at the server device. This document describes systems and techniques for initiating a remote access session at a server device based on a history of connections to the remote access session and/or connecting a client device to the remote access session at the server device based on proximity of a mobile device to the client device, which may allow the client device to complete the connection operation before a user of the mobile device logs onto to the client device.

The mobile device may be carried, for example, by a person. The mobile device provides information identifying a geographical location of the mobile device to a remote access system. The remote access system determines whether the location of the mobile device is within a threshold distance from a client device that is associated with the mobile device and a remote access session. If so, the remote access system causes the client device to connect to the remote access session at a server device. The remote access session may be, for example, a terminal server session or a remote desktop virtualization session. The client device may communicate with the server device for the remote access session using, for example, a remote display protocol, such as the Remote Desktop Protocol (RDP) or the Independent Computing Architecture (ICA) protocol. The person may then use the remote access session at the client device.

Alternatively, or in addition, the remote access system may analyze a history of connections to the remote access session from the client device when the mobile device was within the threshold distance to determine days (e.g., days of the year, days of the month, and/or days of the week) and/or times of the day in which connections are made to the remote access session from the client device. The remote access system may then initiate the remote access session at the server device just prior to the days (e.g., days of the year, days of the month, and/or days of the week) and/or times of the day in which connections to the remote access session frequently occur from the client device.

The systems and techniques described here may provide one or more of the following advantages. The remote access system may reduce an amount of time to provide a remote access session to a user of a client device by causing the client device to connect to the remote access session before the user accesses the client device. The remote access system may reduce an amount of time to provide a remote access session to a user of a client device by causing a server device to initiate the remote access session before the user accesses the client device. Conventionally, a remote access session that has been initiated at a server device causes the server device to use electricity. The server device may use electricity even when the client device has not yet connected to the remote access session and the remote access session is not being used. The remote access system may reduce an amount of energy or electricity used to provide a remote access session to a user of a client device by waiting to cause the server device to initiate the remote access session until a time when the user is likely to use the remote access session.

FIG. 1 is a schematic diagram that shows an example of a system 100 for initiating a remote access session based on a history of connections to the remote access session and/or for connecting to the remote access session based on proximity of a mobile device 102, such as a smartphone, a tablet device, or a smart watch. The mobile device 102 is in communication with a remote access system 104 over a network 106, such as a local area network (LAN) or one or more of the computing devices that form the Internet. The remote access system 104 may include one or more computing devices that perform the operations of the remote access system 104. The remote access system 104 causes a client device to connect to a remote access session when the mobile device 102 is in proximity to the client device. The mobile device 102 may be associated with a person or user. The remote access system 104 may also host and/or initiate the remote access session, for example, at a day (e.g., day of the year, day of the month, and/or day of the week) and/or time of day prior to a day (e.g., day of the year, day of the month, and/or day of the week) and/or time of day at which the person is likely to connect to and use the remote access session at the client device.

The remote access system 104 stores information that identifies locations of one or more client devices 108*a-b* that are associated with the mobile device 102 and information that identifies remote access sessions that are associated with the client devices 108*a-b* and/or the mobile device 102. In some implementations, the information that identifies the locations of the client devices 108*a-b* and the information that identifies the remote access sessions may be configured by a user of the mobile device 102, the remote access system 104, and/or the client devices 108*a-b*. In some implementations, the remote access system 104 may determine the information that identifies the locations of the client devices 108*a-b* and the information that identifies the remote access sessions by analyzing a historical record of connections to remote access sessions from the client devices 108*a-b* and by correlating the record of connections with a historical record of locations provided by the mobile device 102.

For example, the first client device 108*a* may be a computing device at a home of a user of the mobile device 102 and the second client device 108*b* may be a computing device at a work office of the user. As the mobile device 102 is moved from one location to another, the mobile device 102 repeatedly identifies a location 110 of the mobile device 102 and provides information identifying the location 110 to the remote access system 104 over the network 106. The remote access system 104 compares the location 110 of the mobile device 102 to the locations of the client devices 108*a-b* to determine whether the mobile device 102 is located within one or more threshold distances 112*a-c* from the client device 108*a-b*. If the remote access system 104 determines that the location 110 of the mobile device 102 is within the threshold distance 112*a* from the first client device 108*a*, then the remote access system 104 sends a remote access command 114 to the first client device 108*a* to cause the first client device 108*a* to open a connection 116 to the remote access session that is associated with the first client device 108*a* and/or the mobile device 102. The remote access command 114 is a communication from a manager application at the remote access system 104 to a client application at the first client device 108*a* that causes the client device 108*a* to connect to the remote access session at a server device.

The remote access session is in operation at the server device. The server device may include one or more computing devices that perform the operations of the server device. The server device may be included in the remote access system 104 or another system that is separate and/or distinct from the remote access system 104. A server application at the server device initiates the remote access session. Initiating the remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. In some implementations, the server application initiates the remote access session in response to determining that the remote access session has not already been initiated and a request from one of the client devices 108*a-b* to connect to the remote access session has been received.

Alternatively, or in addition, the remote access system 104 and/or the mobile device 102 may store a record of days and/or times of day when the user has connected to the remote access session. The remote access system 104 and/or the mobile device 102 may then determine the days and/or times of day that the user is likely to connect to the remote access session. In response, the remote access system 104 and/or the mobile device 102 may then send a command to the server device to initiate the remote access session at some time prior to those days and/or times of day, such as five, ten, or twenty-five minutes before each of the days and/or times of day. The remote access system 104 and/or the mobile device 102 may use an amount of time prior to the days and/or times of day that is enough time for the server device to perform the boot-up and/or logon processes for the remote access session before the user is likely to connect to and/or use the remote access session. For example, the remote access system 104 and/or the mobile device 102 may determine how long the server device takes (e.g., an average of the times or the longest time) to initiate the remote access session and choose an amount of time before the days and/or times of day that is at least as long as the time the server device takes to initiate the remote access session.

The remote access session is an instance of a user session or profile at the server device that may be accessed remotely at the client device 108*a* by a client application that connects to the remote access session. The remote access session allows the client devices 108*a-b* to access resources of the server device, such as volatile memory (e.g., random access memory), persistent memory (e.g., a hard drive), a processor (e.g., a central processing unit or a graphics processing unit), a component of an operating system, or an application. One or more of the resources may be physical resources that are accessed through the remote access session (e.g., through a terminal service). One or more of the resources may be virtual resources that accessed through the remote access session (e.g., through remote desktop virtualization). Once the remote access system 104 causes the first client device 108*a* to connect to the remote access session, a user of the first client device 108*a* may then use the remote access session to access the resources of the server device.

The mobile device 102 may continue to provide the location 110 of the mobile device 102 to the remote access system 104. For example, the remote access system 104 may compare the location 110 of the mobile device 102 to the locations of the client devices 108a-b to determine that the mobile device 102 is no longer within the threshold distances 112a-b from the client devices 108a-b. The remote access system 104 may also determine that the first client device 108a is still connected to the remote access session. In response to determining that the mobile device 102 is no longer within the threshold distance 112a from the first client device 108a and/or that the first client device 108a is still connected to the remote access session, the remote access system 104 may send a remote access command to the first client device 108a to cause the first client device 108a to disconnect from the remote access session. Alternatively, the remote access system 104 may allow the first client device 108a to remain connected to the remote access session until another client device (e.g., the second client device 108b) connects to the same remote access session. For example, the remote access session may only allow one client device at a time to connect to the remote access session.

The mobile device 102 may provide the location 110 of the mobile device 102 to the remote access system 104 again. The remote access system 104 may compare the location 110 of the mobile device 102 to the locations of the client devices 108a-b to determine that the mobile device 102 is now within the threshold distance 112b from the second client device 108b. In response to determining that the mobile device 102 is within the threshold distance 112b from the second client device 108b, the remote access system 104 may send a remote access command to the second client device 108b to cause the second client device 108b to open a connection 118 to a remote access session. The remote access session that the remote access system 104 causes the second client device 108b to connect to may be the same remote access session that the first client device 108a was connected to or another remote access session that is separate and/or distinct from the remote access session that the first client device 108a was connected to. The remote access system 104 may store information identifying a remote access session that is specific to the mobile device 102 and/or each particular client device that the mobile device 102 is within the threshold distance from. The remote access system 104 may use the stored information identifying the remote access sessions to determine which remote access session to cause a client device to connect to when the mobile device 102 is within the threshold distance from the client device.

While shown as circular in FIG. 1, the threshold distances 112a-b may be a shape other than circular. For example, the threshold distances 112a-b may include coordinates of a polygon or polyhedron around the client devices 108a-b, respectively. While shown as two-dimensional in FIG. 1, the threshold distances 112a-b may be three-dimensional. For example, the locations of the mobile device 102 and the client devices 108a-b may specify latitude, longitude, and elevation. The remote access system 104 may compare the latitude, longitude, and/or elevation from the location 110 of the mobile device to the latitude, longitude, and/or elevation for the client devices 108a-b to determine whether the mobile device 102 is within the threshold distances 112a-b of the client devices 108a-b, respectively.

In some implementations, the threshold distances 112a-b may be chosen so that the client devices 108a-b are able to connect to a respective remote access session before a user attempts to access the respective client device. For example, the threshold distances 112a-b may be based on how often the client devices 108a-b check for remote access commands from the remote access system 104, how fast the mobile device 102 is able to travel to the client devices 108a-b, and/or how long the client devices 108a-b take to connect to the respective remote access session. The remote access system 104 may calculate the threshold distances 112a-b. The remote access system 104 may expand a threshold distance if a user attempts to access a client device before the client device has finished connecting to the remote access session. The remote access system 104 may contract a threshold distance if a user routinely accesses a client device more than a threshold amount of time after the client device has finished connecting to the remote access session.

In some implementations, the mobile device 102 may communicate with the network 106 through a wireless connection, such as a terrestrial wireless communication system (e.g., a cellular data network 120 or one or more Wi-Fi networks 122) or a satellite system 124. The mobile device 102 may determine the location 110 of the mobile device 102 by accessing a global positioning system, or by triangulation of or proximity to signals from one or more terrestrial antennas with known locations, such as cellular data network towers in the cellular data network 120 or Wi-Fi devices in the Wi-Fi networks 122.

Figure 2:
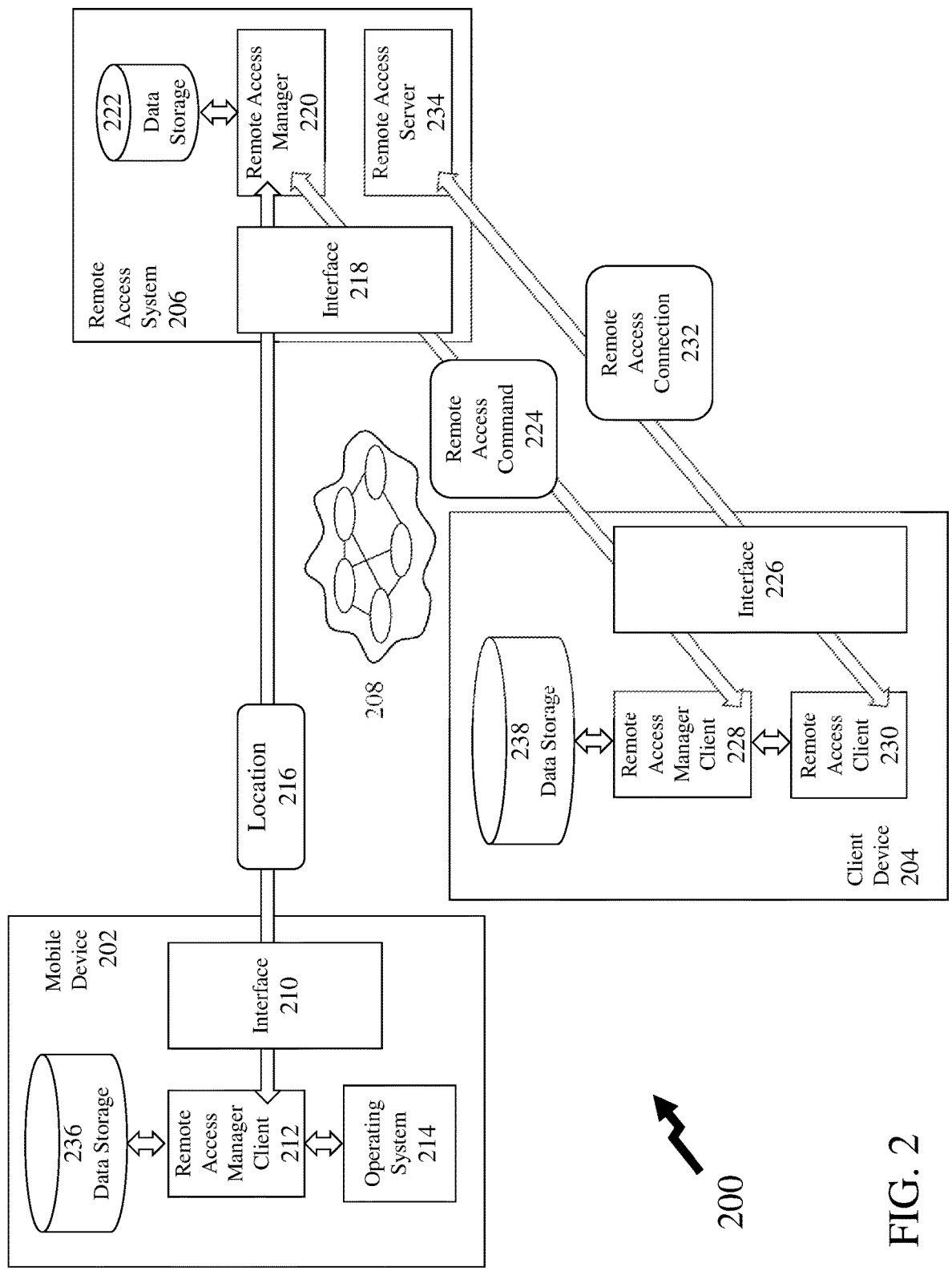
FIG. 2 is a block diagram that shows an example of a system for initiating a remote access session based on a history of connections to the remote access session and/or for connecting to the remote access session based on proximity of a mobile device.

FIG. 2 is a block diagram that shows an example of a system 200 for initiating a remote access session based on a history of connections to the remote access session and/or for connecting to the remote access session based on proximity of a mobile device 202. The system 200 includes the mobile device 202 and a client device 204 in communication with a remote access system 206 over a network 208. The mobile device 202 includes one or more interfaces 210 to wirelessly communicate with the network 208, such as interfaces to the cellular data network 120, the Wi-Fi network 122, and/or the satellite system 124. The mobile device 202 includes a remote access manager client 212 that communicates with an operating system 214 of the mobile device 202, for example, to determine a location 216 of the mobile device 202. The operating system 214 of the mobile device 202 may use one or more of the global positioning system and/or terrestrial antennas to determine or approximate the location 216 of the mobile device 202. The mobile device 202 provides the location 216 to the remote access system 206 over the network 208.

The remote access system 206 includes an interface 218 to communicate with the network 208. The remote access system 206 also includes a remote access manager 220 that receives the location 216 from the mobile device 202 through the interface 218. The remote access manager 220 includes a data storage 222 that stores information that identifies a location of the client device 204, a threshold distance from the location of the client device 204, and/or a remote access session associated with the client device 204 and/or the mobile device 202. The remote access manager 220 compares the location 216 received from the mobile device 202 to the location of the client device 204 and the threshold distance from the data storage 222 to determine that the mobile device 202 is within the threshold distance from the client device 204. In response, the remote access manager 220 sends a remote access command 224 to the client device 204 to initiate and/or connect to the remote access session associated with the client device 204 and/or the mobile device 202.

The client device 204 includes an interface 226 to communicate with the network 208. The client device 204 also includes a remote access manager client 228 that receives the remote access command 224 from the remote access system 206 through the interface 226. In response, the remote access manager client 228 instructs a remote access client 230 at the client device 204 to open a connection 232 to a remote access session provided by a remote access server 234.

The remote access server 234 is hosted at a server device that may include one or more computing devices. The server device may be included in the remote access system 206 or a system that is separate and/or distinct from the remote access system 206. The remote access manager 220 may cause the remote access server 234 to initiate a remote access session. Once connected, a user of the client device 204 may access resources provided by the server device through the connection 232 to the remote access session.

In some implementations, the remote access manager client 212 at the mobile device 202 and/or the remote access manager client 228 at the client device 204 receive an input from a user, device, and/or application that includes manager authentication information, such as a username, password, and/or one-time password. The remote access manager client 212 and/or the remote access manager client 228 may provide the manager authentication information to the remote access manager 220. The remote access manager 220 may condition the sending of the remote access command 224 on having successfully verified the manager authentication information received from the mobile device 202 and the client device 204 against corresponding authentication information that is stored at the remote access system 206 in the data storage 222 (e.g., a username and/or password) and/or calculated by the remote access manager 220 (e.g., a one-time password).

In some implementations, the manager authentication information may include information from an access device at a particular location, such as a proximity card reader device or biometric reader device (e.g., an iris, fingerprint, or facial scanner) at a worksite. The mobile device 202 may communicate with the access device to determine whether the proximity card or biometric factor has been successfully read. The access device may provide information to the mobile device 202 regarding whether the card or factor has been successfully read. The mobile device 202 may provide the information to the remote access system 206, for example, with the manager authentication information. Alternatively, the access device may provide the information regarding whether the card or factor has been successfully read to the remote access system 206. The information provided to the remote access system 206 by the mobile device 202 and/or the access device may also include information that identifies a user account associated with the card and/or factor. The information provided to the remote access system 206 by the mobile device 202 and/or the access device may also include information that identifies the access device and/or the location of the access device. The user account may be associated with a remote access session at the remote access system 206. The combination of the access device/location of the access device and the user account may be associated with the client device 204. In some implementations, the remote access system 206 may initiate the remote access session at the remote access server 234 and/or cause the client device 204 to connect to the remote access session in response to receiving the information identifying the access device/location of the access device and the user account.

In response to successfully verifying the received manager authentication information, the remote access manager 220 may perform a transformation on the received manager authentication information and/or additional information, such as by creating a hash of the information, to generate a key. The remote access manager 220 may provide the key to the remote access manager client 212 at the mobile device 202 and/or the remote access manager client 228 at the client device 204. The remote access manager client 212 may store the key in a data storage 236 at the mobile device 202. The remote access manager client 228 may store the key in a data storage 238 at the client device 204. Alternatively, the remote access manager client 212 and/or the remote access manager client 228 may perform the transformation on the manager authentication information and/or additional information to generate the key and store the key in the data storage 236 and/or the data storage 238, respectively. The remote access manager client 212 may provide the key and/or a reverse of the transformation of the key to the remote access system 206 with subsequent instances of the location 216 of the mobile device 202 for authentication of the mobile device 202 by the remote access system 206. The remote access manager client 228 may provide the key and/or a reverse of the transformation of the key to the remote access system 206 with subsequent checks for remote access commands for authentication of the client device 204 by the remote access system 206. The communications between the mobile device 202, the remote access system 206, and/or the client device 204 over the network 208 may be encrypted.

In some implementations, the manager authentication information used for authenticating the remote access manager client 228 at the client device 204 with the remote access manager 220 at the remote access system 206 is the same authentication information that is used to authenticate the remote access client 230 with the remote access server 234. Alternatively, or in addition, server authentication information, such as a username, password, and/or one-time password, used to authenticate the remote access client 230 with the remote access server 234 may be separate and/or distinct from the manager authentication information used for authenticating the remote access manager client 228 with the remote access manager 220. For example, the remote access client 230 at the client device 204 may receive an input from a user, device, and/or application that includes the server authentication information. The remote access client 230 may provide the authentication information to the remote access manager 220 and/or the remote access server 234. The remote access server 234 may condition the initiation of the remote access session and/or the connection of the remote access client 230 to the remote access session provided by the remote access server 234 on having successfully verified the server authentication information received from the client device 204 against authentication information that is stored at the server device for the remote access server 234 (e.g., a user name and/or password) and/or calculated by the remote access server 234 (e.g., a one-time password).

In response to successfully verifying the server authentication information received from the remote access client 230, the remote access server 234 may perform a transformation on the received server authentication information and/or additional information, such as by creating a hash of the information, to generate a key. The remote access server 234 may provide the key to the remote access client 230 at the client device 204. The remote access client 230 may store the key in the data storage 238 at the client device 204. Alternatively, the remote access client 230 may perform the transformation on the authentication information and/or additional information to generate the key and store the key in the data storage 238. The remote access client 230 may provide the key and/or a reverse of the transformation of the key to the remote access server 234 with subsequent requests for initiation of and/or connection to the remote access session for authentication of the client device 204 by the remote access server 234.

In response to the remote access manager client 228 receiving the remote access command 224, the remote access manager client 228 may instruct the remote access client 230 to connect to the remote access session provided by the remote access server 234 in the background of a user profile for the client device 204 while a user interface of the client device 204 remains locked. A user may then provide authentication information to the client device 204 to unlock the user interface for the user profile where the remote access client 230 established the connection 232 to the remote access session.

The remote access manager 220 may store the server authentication information received from the remote access client 230 and/or the remote access manager client 228 for initiating and/or connecting to the remote access server 234. The server authentication information may include, for example, the username, password, and/or one-time password or the key and/or a reverse of the transformation of the key. In addition, the server authentication information may include an application specific password generated specifically for the remote access manager 220 and for initiating and/or connecting to the remote access session provided by the remote access server 234. The remote access manager 220 may store the server authentication information in the data storage 222. The remote access manager 220 may provide the server authentication information to the remote access server 234 with a request to initiate the remote access session based on a history of connections to the remote access session.

For example, the remote access manager 220 and/or the remote access server 234 may record and store information that identifies the days (e.g., days of the year, days of the month, and/or days of the week) and times of day at which the user connects to the remote access session. The remote access manager 220 and/or the remote access server 234 may also record and store information that identifies the applications the user accesses within the remote access session. The remote access manager 220 analyzes the stored information for the user to identify one or more days (e.g., days of the year, days of the month, and/or days of the week) and one or more times of day for those days at which the user connects to the remote access session. The remote access manager 220 may then use the stored server authentication information to authenticate with the remote access server 234 and send the request to initiate the remote access session at a time that is before the identified days and times of day. Alternatively, or in addition, for example if the server authentication information has not already been stored, the remote access manager 220 may send a request to the user at the mobile device 202 and/or the client device 204 for the server authentication information just before the time that is before the identified days and times of day. The remote access manager 220 may then use the server authentication information received from the mobile device 202 and/or the client device 204 to authenticate with the remote access server 234 and send the request to initiate the remote access session at the time that is before the identified days and times of day. The remote access manager 220 may also store the received server authentication information, for example, in the data storage 222 as previously described.

The remote access manager 220 and/or the remote access server 234 may record and/or store information regarding the amount of time the remote access server 234 has historically taken to initiate the remote access session, such as the actual amounts of time, a rolling average of the amounts of time, and/or a maximum amount of time for a particular time period in the past. The remote access manager 220 may send the request to the remote access server 234 to initiate the remote access session at a time before the identified days and/or times of day that is at least the average or the maximum of the time the remote access server 234 historically takes to initiate the remote access session. Alternatively, or in addition, the remote access manager 220 may send the request to the remote access server 234 to initiate the remote access session at a time before the identified days and/or times of day that is at least a predetermined amount of time, such as five, ten, and/or twenty-five minutes.

The remote access manager 220 may send a command to the remote access server 234 to disconnect from the remote access session, for example, once the remote access manager 220 has verified that the remote access server 234 has completed the initiation of the remote access session. The remote access manager 220 may cause the remote access server 234 to disconnect from the remote access session to allow the client device 204 to connect to the remote access session. The remote access manager 220 may also send a command to the remote access server 234 to log off and/or terminate the remote access session if the client device 204 does not connect to the remote access session within a threshold amount of time from the identified day and/or time of day for which the remote access session was initiated. Further, the remote access manager 220 may send a command to the remote access server 234 to log off and/or terminate the remote access session a threshold amount of time after the client device 204 disconnects from the remote access session.

Figure 3:
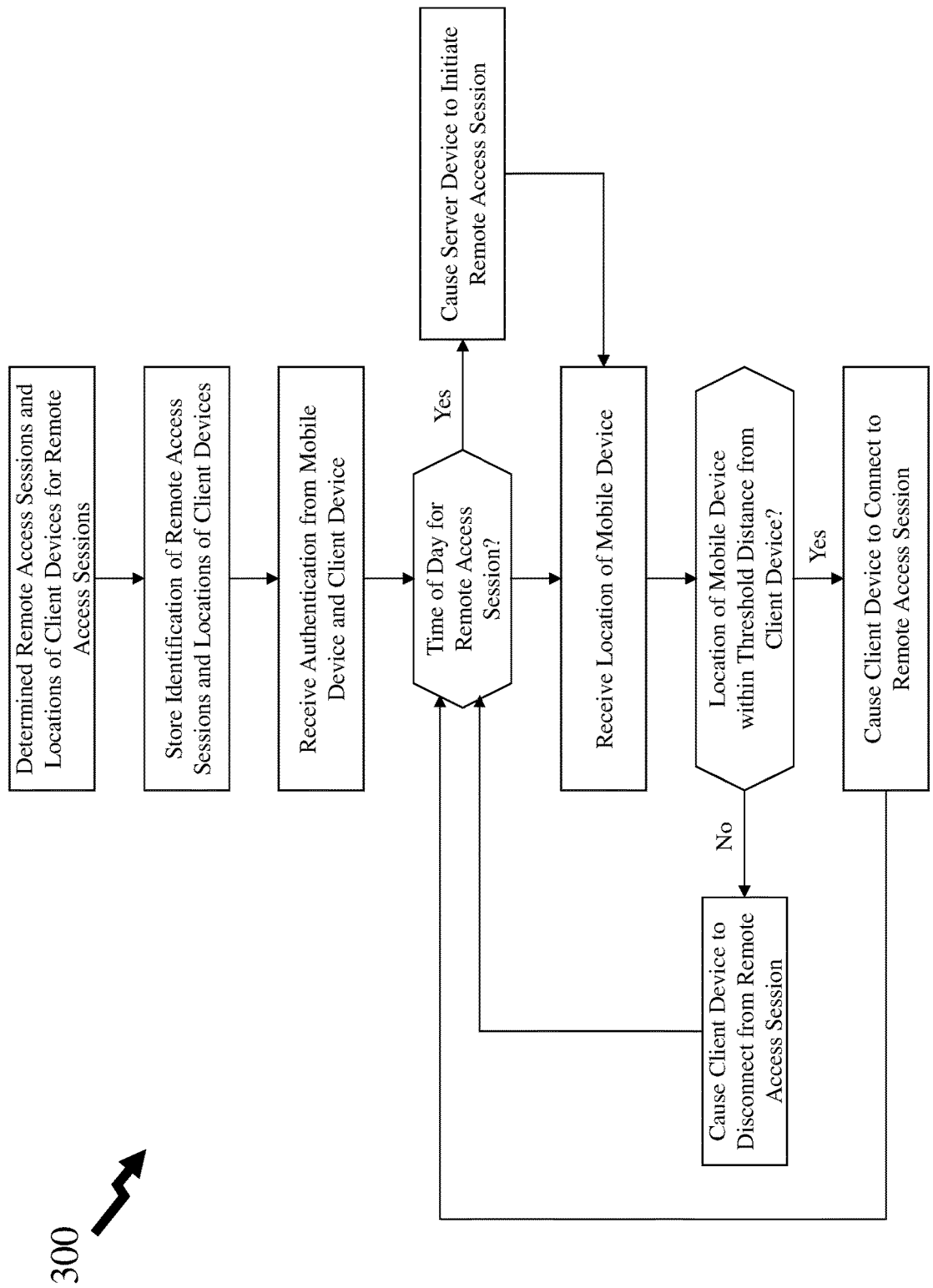
FIG. 3 is flow chart that shows an example of a process for initiating a remote access session based on a history of connections to the remote access session and/or for connecting to the remote access session based on proximity of a mobile device.

FIG. 3 is flow chart that shows an example of a process 300 for initiating a remote access session based on a history of connections to the remote access session and/or for connecting to the remote access session based on proximity of a mobile device. The process 300 may be performed, for example, by a system such as the system 100 and the system 200. For clarity of presentation, the description that follows uses the system 100 and the system 200 as examples for describing the process 300. However, another system, or combination of systems, may be used to perform the process 300.

The process 300 may begin, at block 302, with identifying one or more remote access sessions connected to one or more client devices and locations of the client devices. For example, a remote access manager client at the first client device 108*a* may report to the remote access system 104 that a remote access client at the first client device 108*a* has connected to one or more instances of one or more remote access sessions at a server device and a remote access manager client at the second client device 108*b* may report to the remote access system 104 that a remote access client at the second client device 108*b* has connected to one or more instances of one or more remote access sessions at a server device.

A remote access manager client at the mobile device 102 may provide locations of the mobile device 102 to the remote access system 104 at or near the times that the client devices 108*a-b* connected to the instances of the remote access sessions. The remote access system 104 may then determine that times for ones of the locations of the mobile device 102 correspond to times for the connections to the instances of the remote access sessions. The remote access system 104 may associate a client device with a location of the mobile device 102 if a threshold number of times of locations provided by the mobile device 102 correspond to times of connections from the client device and the locations are within a threshold distance from one another. For example, the remote access system 104 may associate the first client device 108a with an average of the locations of the mobile device 102 corresponding to times of a threshold number of connections from the first client device 108a to the same remote access session. The remote access system 104 may also associate the mobile device 102 with the remote access session to which the first client device 108a connected. Alternatively, or in addition, the remote access system 104 may receive one or more inputs from a user that manually specify the locations of one or more of the client devices 108a-b. Alternatively, or in addition, the remote access system 104 may receive the locations of one or more of the client devices 108a-b from the client devices 108a-b, for example, using a Wi-Fi positioning system with locations of known Wi-Fi networks.

In some implementations, the remote access system 104 may compare the days and/or the times of day of the locations for the same remote access session, client device, and/or mobile device to one another to determine that a threshold number of the days and/or the times of day are within a threshold range of a particular day and/or time of day. The comparison of the days may include comparing the days of the week of the remote access sessions for the user to determine that the threshold number of the days and/or times of day are within the threshold range from the particular day and/or time of day for a particular day of the week. The comparison of the days may include comparing the days (e.g., days of the year, days of the month, and/or days of the week) of the remote access sessions for the user to determine that the threshold number of the days and/or times of day are within the threshold range from the particular day and/or time of day for a particular day of the year. The remote access system 104 may then store a representation of the particular day and/or time of day and associate the particular day and/or time of day with the remote access session.

At block 304, the process 300 includes storing, in a memory, the identification of the remote access sessions and the corresponding locations of the client devices. For example, the remote access manager 220 may store the identification of the remote access session provided by the remote access server 234 for the client device 204 and the corresponding location of the client device 204 in the data storage 222.

At block 306, the process 300 includes receiving an authentication for a user account from the mobile device and an authentication for the user account from a client device, where the remote access session is associated with the user account. For example, the remote access manager 220 at the remote access system 206 may receive authentication information for a user account from the remote access manager client 212 at the mobile device 202 and the remote access manager client 228 at the client device 204.

At block 308, the process 300 includes determining whether a day and/or time of day for a remote access session has occurred. If so, then the process 300 includes, at block 310, causing a server device to initiate the remote access session. For example, the remote access manager 220 may store one or more times of day and days of week, month, or year for one or more remote access sessions to which the client device 204 connects. The client device 204 may connect to a first remote access session as early as eight o'clock in the morning on Monday when the mobile device 202 is present, but not until nine o'clock in the morning Tuesday through Friday. The client device 204 may connect to a second remote access session at noon on Saturday when a second mobile device is present. The remote access manager 220 may instruct the remote access server 234 to initiate the first remote access session each Monday some time before eight o'clock and each Tuesday through Friday some time before nine o'clock, such as five, ten, twenty, or thirty minutes before. The remote access manager 220 may instruct the remote access server 234 or another remote access server to initiate the second remote access session each Saturday some time before noon. Initiating a remote access session may include instantiating the remote access session at a server device so that the remote access session is ready to be connected to by a client device. In some implementations, the remote access manager 220 may randomly stagger the initiation of the remote access sessions to prevent too many remote access sessions from being initiated at the same time.

At block 312, the process 300 includes receiving, by an interface, information identifying a location of the mobile device. For example, the remote access manager 220 may receive the location 216 from the remote access manager client 212 at the mobile device 202.

At block 314, the process 300 includes comparing, by a processing device, the received information identifying the location of the mobile device to the stored information identifying the locations of the client devices to determine whether the location of the mobile device is within a threshold distance from a location of one of the client devices. For example, the remote access manager 220 may compare the location 216 of the mobile device 202 to a location of the client device 204 that is stored in the data storage 222.

If the process 300 includes determining that the location of the mobile device is within the threshold distance from the location of one of the client devices, then the process 300 includes causing, at block 316, the client device to connect to the remote access session at a server device. Causing the client device to connect to the remote access session may be further in response to the successful authentication of the mobile device and the client device. For example, the remote access manager 220 may send the remote access command 224 to the remote access manager client 228 to cause the remote access client 230 to open the connection 232 to the remote access session provided by the remote access server 234 in response to determining that the location 216 of the mobile device 202 is within the threshold distance from the location of the client device 204.

Otherwise, if the process 300 includes determining that the location of the mobile device is not within the threshold distance from the location of a client device and the client device previously connected to a remote access session, then the process 300 includes causing, at block 318, the client device to disconnect from the remote access session. For example, if the remote access manager 220 determines that the location 216 of the mobile device 202 is no longer within the threshold distance from the client device 204, then the remote access manager 220 may send a command to the remote access manager client 228 at the client device 204 to cause the remote access client 230 to disconnect from the remote access session.

The process 300 may include returning to block 308, where a determination of whether a time of day (and optionally a day of week) for a remote access session has occurred. The process 300 may also return to block 306 to receive an authentication from another mobile device and/or another client device.

Not all illustrated acts may be required to implement the processes in accordance with the disclosed subject matter. For example, the process 300 may include initiating a remote access session by determining one or more remote access sessions, at block 302; storing identification information for the determined sessions, at block 304; determining that a day and/or time of day for one of the determined remote access sessions has occurred, at block 308; and, in response, causing the remote access session to be initiated, at block 310. In another example, the process 300 may include causing a connection to a remote access session by storing information identifying locations of one or more client devices and information identifying one or more remote access sessions corresponding to the client devices, at block 304; receiving information identifying a location of a mobile device, at block 312; determining that the location of the mobile device is within a threshold distance from the location of one of the client devices, at block 314; and, in response, causing the client device to connect to the remote access session at a server device, at block 316.

For simplicity of explanation, the processes of this disclosure are depicted and described as a series of acts. However, acts in accordance with this disclosure can occur in various orders and/or concurrently, and with other acts not presented and described herein. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
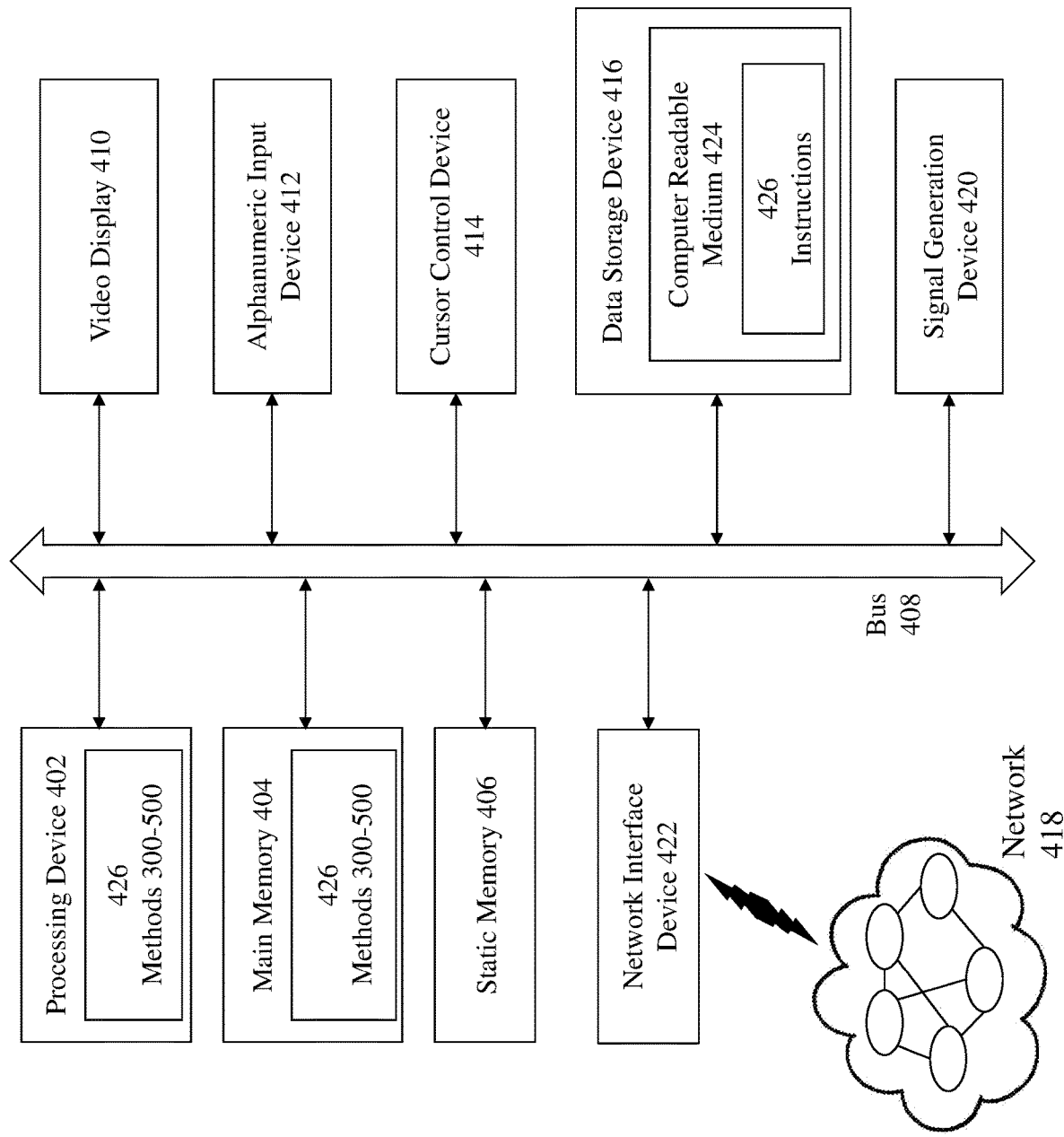
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the remote access manager client 212, the remote access manager 220, the remote access server 234, the remote access manager client 228, and/or the remote access client 230 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the remote access manager client 212, the remote access manager 220, the remote access server 234, the remote access manager client 228, and/or the remote access client 230 embodying any one or more of the methodologies or functions described herein. The sets of instructions 426 of the remote access manager client 212, the remote access manager 220, the remote access server 234, the remote access manager client 228, and/or the remote access client 230 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding, or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether the remote access manager client 212, the remote access manager 220, the remote access server 234, the remote access manager client 228, and/or the remote access client 230 collects user information (e.g., a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the remote access manager client 212, the remote access manager 220, the remote access server 234, the remote access manager client 228, and/or the remote access client 230.

What is claimed is:

1. A method comprising:
   storing, in a memory accessible to a first client device, first client information identifying at least one of:
      first data relating to the first client device and identifying a first remote access session providing the first client device access to resources of a remote access system; and
      second data relating to one or more target days and times of day and identifying the first remote access session providing the first client device access to resources of the remote access system; and
   executing a process upon the first client device; wherein the process comprises:
      determining, by a processing device associated with the first client device, whether the first client information identifies the second data;
      upon a positive determination that the first client information identifies the second data determining a first decision as to whether a first condition with respect to a current date and time of day and one or more target days and times of day has been met;
      upon a positive determination of the first decision causing the first client device to connect to the first remote access session upon the remote access system; and
      data relating to the one or more target days and times of day is stored within another memory accessible to the first client device; and
   the one or more target days and times of day are stored as data within another memory accessible to the first client device where the data relating to the one or more target days and times of day was established by another process comprising
      determining, by the processing device, one or more historical days and times of day corresponding to initiation of other remote access sessions between the remote access system and the first client device;
      comparing, by the processing device, the one or more historical days and times of day to one another to determine that the one or more historical days and times of day are within a threshold range; and establishing the one or more historical days and times of day within the threshold range as a target day and time of day of the one or more target days and times of day.

2. A method comprising:

storing, in a memory accessible to a first client device, first client information identifying at least one of:
  first data relating to the first client device and identifying a first remote access session providing the first client device access to resources of a remote access system; and
  second data relating to one or more target days and times of day and identifying the first remote access session providing the first client device access to resources of the remote access system; and executing a process upon the first client device; wherein the process comprises:
  receiving, by an interface of the first client device, first mobile information identifying a first location of a mobile device;
  determining, by a processing device associated with the first client device; whether the first client information identifies the second data;
  upon a positive determination that the first client information identifies the second data determining a first decision as to whether a first condition with respect to a current date and time of day and one or more target days and times of day has been met;
  determining, by the processing device, a second decision as to whether the first location of the mobile device is within a first threshold distance from a location of the first client device; and
  upon a positive determination of the first decision and the second decision causing the first client device to connect to the first remote access session upon the remote access system.

3. A method comprising:

storing, in a memory accessible to a first client device, first client information identifying at least one of:
  first data relating to the first client device and identifying a first remote access session providing the first client device access to resources of a remote access system; and
  second data relating to one or more target days and times of day and identifying the first remote access session providing the first client device access to resources of the remote access system; and executing a process upon the first client device; wherein the process comprises:
  determining, by a processing device associated with the first client device, whether the first client information identifies the second data;
  upon a positive determination that the first client information identifies the second data determining a first decision as to whether a first condition with respect to a current date and time of day and one or more target days and times of day has been met; and
  upon a positive determination of the first decision causing the first client device to connect to the first remote access session upon the remote access system;
  determining periodically mobile information identifying locations of a mobile device;
  determining a second decision as to whether a second condition with respect to the mobile information and a location of the first client device has been met; and
  upon a positive determination with respect to the second decision causing the first client device to disconnect from the first remote access session upon the remote access system.

4. A method comprising:

storing, in a memory accessible to a first client device, first client information identifying at least one of:
  first data relating to the first client device and identifying a first remote access session providing the first client device access to resources of a remote access system; and
  second data relating to one or more target days and times of day and identifying the first remote access session providing the first client device access to resources of the remote access system; and executing a process upon the first client device; Wherein the process comprises:
  determining, by a processing device associated with the first client device, whether the first client information identifies the second data;
  upon a positive determination that the first client information identifies the second data determining a first decision as to whether a first condition with respect to a current date and time of day and one or more target days and times of day has been met; and
  upon a positive determination of the first decision causing the first client device to connect to the first remote access session upon the remote access system;
  determining, by the processing device, a second decision as to whether a second condition with respect to another current date and time of day and another of the one or more target days and times of day has been met;
  determining periodically mobile information identifying locations of a mobile device;
  determining a third decision as to whether a third condition with respect to the mobile information and a location of the first client device has been met; and
  upon a positive determination with respect to at least one of the second decision and the third decision causing the first client device to disconnect from the first remote access session upon the remote access system.

5. A method comprising:

storing, in a memory accessible to a first client device, first client information identifying at least one of:
  first data relating to the first client device and identifying a first remote access session providing the first client device access to resources of a remote access system; and
  second data relating to one or more target days and times of day and identifying the first remote access session providing the first client device access to resources of the remote access system; and executing a process upon the first client device; wherein the process comprises:
  determining, by a processing device associated with the first client device; whether the first client information identifies the second data;
  upon a positive determination that the first client information identifies the second data determining E first decision as to whether a first condition with respect to a current date and time of day and one or more target days and times of day has been met; and upon a positive determination of the first decision causing the first client device to connect to the first remote access session upon the remote access system; and the first decision includes a threshold value where the threshold value is established in dependence upon at least one of:

how frequently the first client device checks for remote access commands from the remote access system;

how fast a mobile device is moving towards the first client device; and how long the first client device takes to connect to the remote session.

\* \* \* \* \*